H. KARDOS, DEC'D.
A. A. KREMER & L. VON KEVICZKY, ADMINISTRATORS.
AERODROME.
APPLICATION FILED DEC. 27, 1909.
1,010,374.
Patented Nov. 28, 1911.
4 SHEETS—SHEET 1.
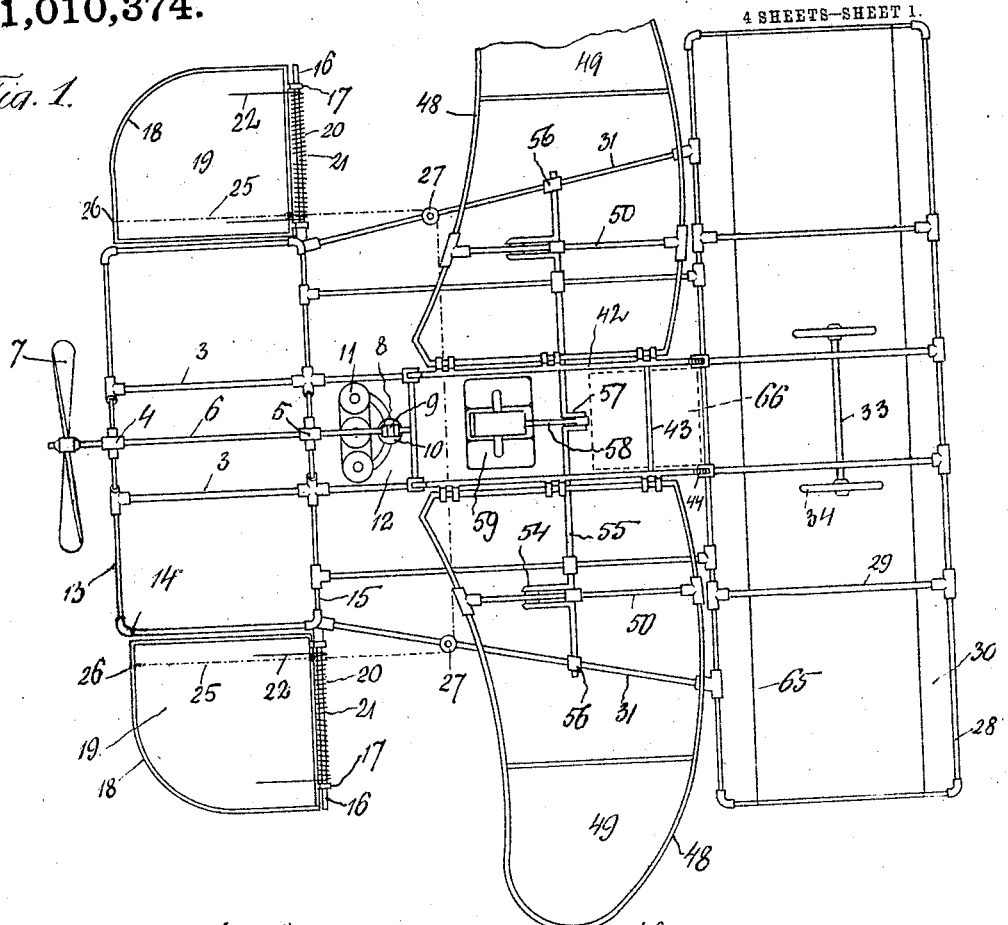
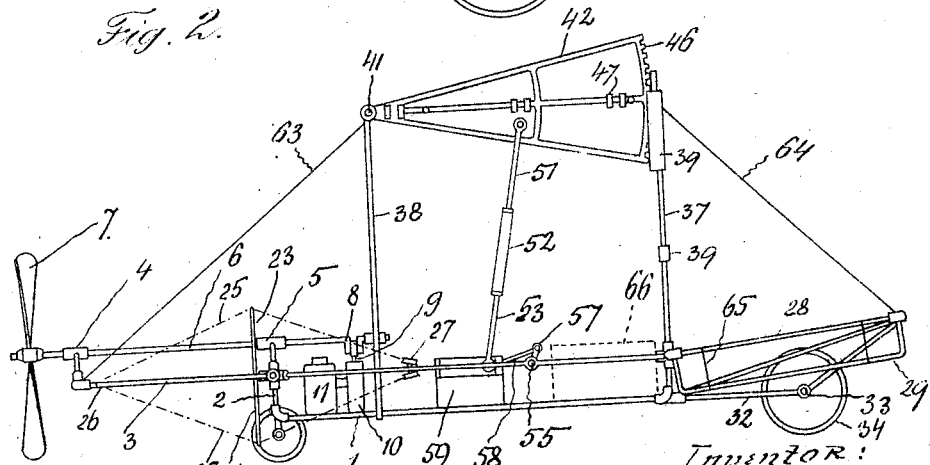
Witnesses:
A. H. Rabsag
K. H. Butler
Inventor:
Hugo Kardos
by
Attorneys

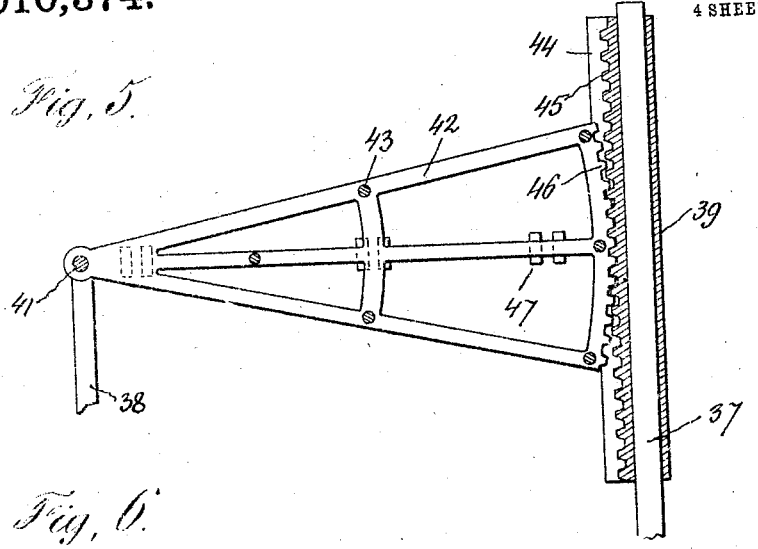
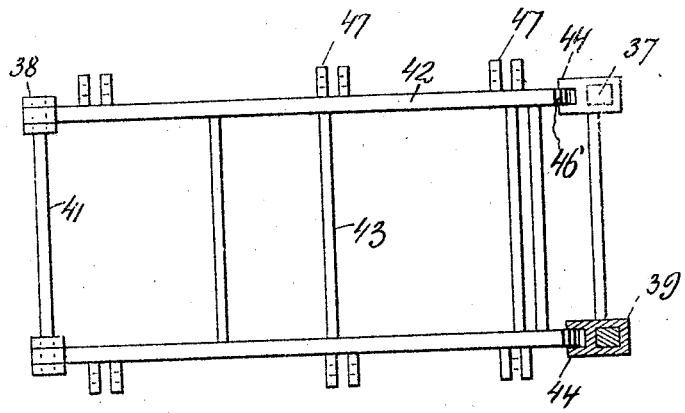

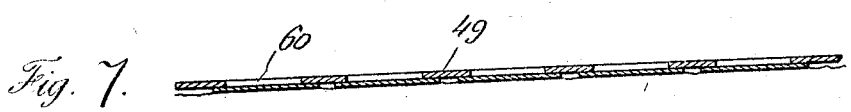
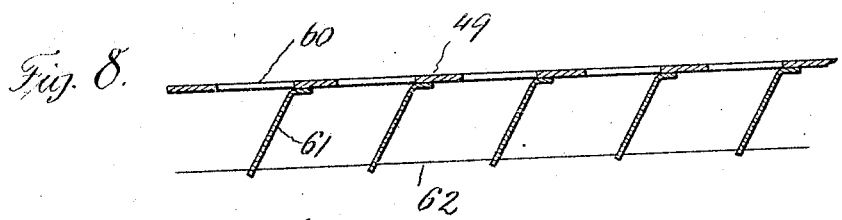
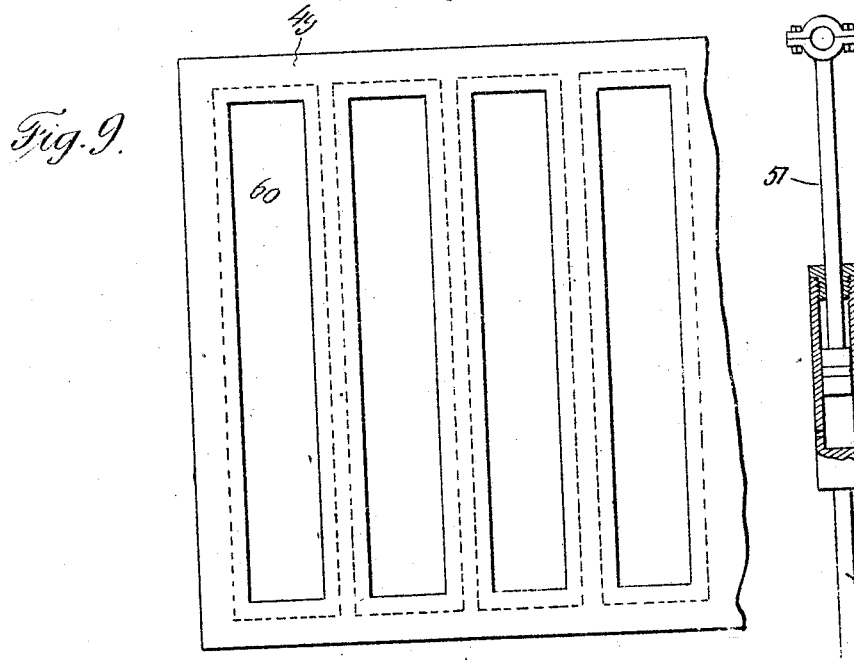
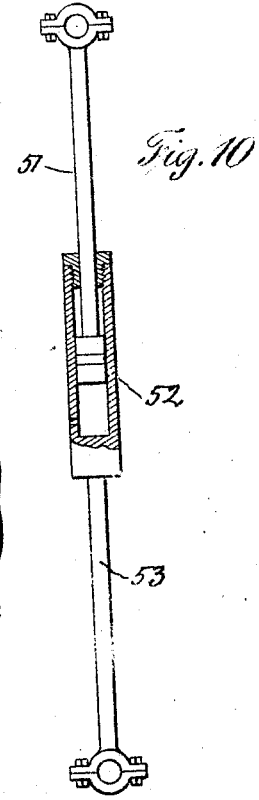

UNITED STATES PATENT OFFICE.

HUGO KARDOS, OF NEW YORK, N. Y., ASSIGNOR OF ONE-HALF TO A. J. MOISANT, OF NEW YORK, N. Y.; ARPAD A. KREMER AND LADISLAUS von KEVICZKY, BOTH OF NEW YORK COUNTY, NEW YORK, ADMINISTRATORS OF SAID HUGO KARDOS, DECEASED.

AERODROME.

1,010,374.      Specification of Letters Patent.      Patented Nov. 28, 1911.

Application filed December 27, 1909. Serial No. 535,119.

*To all whom it may concern:*

Be it known that I, HUGO KARDOS, a subject of the King of Hungary, residing at New York, in the county of New York and State of New York, have invented certain new and useful Improvements in Aerodromes, of which the following is a specification, reference being had therein to the accompanying drawing.

This invention relates to aerodromes, and more particularly to that type of machine using a multiplicity of planes to insure stability when traveling through the air.

The object of my invention is to provide a machine of the above type that will embody such requisite qualifications as stability, durability, simplicity, safety and perfect control under all unforeseen and unexpected aerial conditions.

I attain the above object by a machine embodying a main and central frame, stern planes, bow planes, intermediate planes, trucks, and a propeller and mechanism for operating the same. Associated with these elements or instrumentalities are certain devices for adjusting the planes, and normally maintaining the planes in a horizontal position, and other devices for cushioning or retarding an undue movement of certain planes when encountering air currents. All of these elements and devices will be hereinafter considered separately under their respective captions and then considered collectively in the general operation of the machine.

Reference will now be had to the drawings, wherein:—

Figure 3:
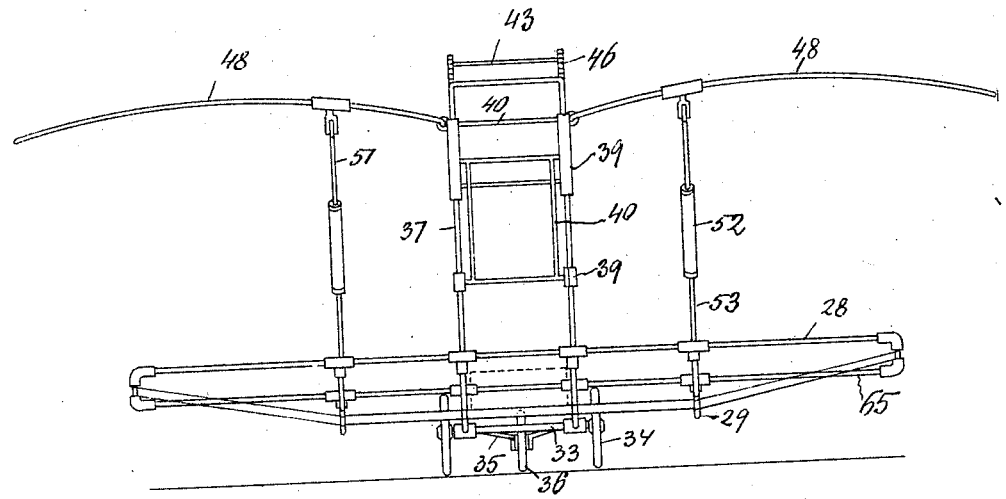
Figure 4:
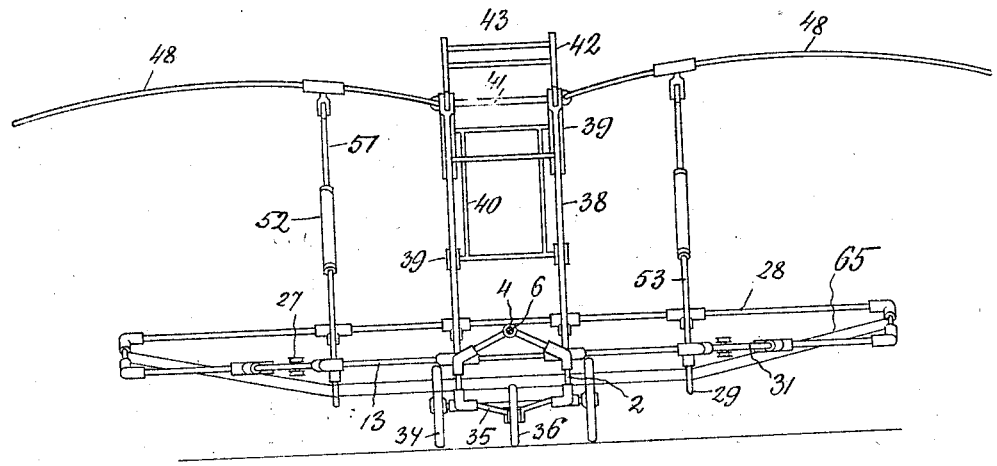

Figure 1 is a plan of the aerodrome, partly broken away, Fig. 2 is a side elevation of the same, Fig. 3 is a view of the bow of the machine, Fig. 4 is a view of the stern of the machine, Fig. 5 is an enlarged vertical sectional view of a plane or wing shifting device, Fig. 6 is a plan of the same, Fig. 7 is a longitudinal sectional view of a portion of one of the intermediate planes or wings, showing the flap valves thereof closed, Fig. 8 is a similar view with the valves open, Fig. 9 is a plan of a portion of one of the intermediate planes or wings, and Fig. 10 is an enlarged elevation, partly broken away and partly in section, of a cushioning and retarding device adapted to be used in connection with the intermediate planes or wings.

The main and central frame of the machine, besides other frames carried thereby, is constructed of bamboo or a light and durable material, but in such machines capable of carrying four or five passengers, the various frames can be constructed of metal, for instance piping connected by elbows and T's.

The main and central frame comprises a rectangular frame 1 having the rear end thereof provided with an inverted V-shaped frame 2 and connected to said frame is an extension 3 having the outer end thereof provided with a central bearing 4 longitudinally alining with a bearing 5, carried by the frame 2. Journaled in the bearings 4 and 5 is a longitudinal propeller shaft 6 and the rear end of said shaft is provided with propeller blades 7, while the forward end is provided with a crank 8 adapted to be connected to the piston 9 of an engine cylinder 10, the engine 11 being supported upon a platform 12 in the main frame 1. The propeller is employed for driving the machine forward.

The extension 3 is provided with horizontal side frames 13 and these frames are adapted to support stern planes 14 made of silk or a suitable cloth.

The forward rods 15 of the frames 13 are provided with side extensions 16 and pivotally mounted upon said side extensions, as at 17 are shiftable stern plane frames 18 adapted to support planes 19 somewhat similar to the planes 14, with the exception that the outer rear edges of said planes are rounded. Encircling the extensions 16 are coiled springs 20, each spring having one end fixed to the extensions 16, as at 21, while the opposite end of the spring extends over the planes 19, as at 22, the end of one spring extending over the plane and the end of the other spring under the plane. The function of these springs is to normally maintain the shiftable planes in a horizontal position. In order that the planes can be shifted, a pivot connection 17 of each plane is provided with an upwardly extending arm 23, and a depending arm 24. Connected to the outer ends of these arms are cables 25, said cables having the rear ends thereof connected to the rear edges of the frames 18, as at 26, while the forward ends pass over sheaves 27 and extend to the platform 12, whereby they can be manipulated by the operator of the machine.

The forward end of the frame 1 supports a transverse bow frame 28 having a central depending portion 29. The frame 28 is adapted to support bow planes 30 constructed of a material similar to the frames 14 and 19. The frame 28 is connected by angularly disposed braces 31 to the rods 15 of the side frames 13, and it is these braces that support the revoluble sheaves 27. The frame 28 is provided with hangers 32 for an axle 33 supporting revoluble wheels 34, the hangers, axle and wheels constituting a forward truck, while a rear truck is carried by the frame 1 and comprises hangers 35 and a single wheel 36.

The frame 1 is provided with uprights 37, 38 and slidably mounted upon the uprights 37 are the upper and lower sleeves 39 of a vertically movable shifting frame 40. The upper ends of the uprights 38 are connected by a transverse rod 41 having pivotally mounted thereon sector frames 42 which are connected together by transverse tie rods 43. The frames 42 are angularly adjusted on their pivots by vertically moving the frame 40 and said frames 42 constitute an adjusting device for changing the angularity of the intermediate planes or wings with respect to the longitudinal axis of the machine. The upper sleeves 39 of the frame 40 are provided with vertical grooves 44 and with the inner wall thereof toothed as at 45 which are adapted to mesh with the teeth 46 of the sector frames 42. The teeth 45 and 46 are adapted to prevent the slipping of the sector frames 42 when the sector frames 42 are adjusted on their pivots by vertically moving the frame 40. The outer sides of the frames 42 are provided with bearings 47 and pivotally connected to said bearings are the intermediate frames 48 for supporting the intermediate planes 49 which are constructed of a material similar to the planes 14, 19 and 30. The frames 48 are provided with longitudinal rods 50 and pivotally mounted upon said rods are piston rods 51 each carrying a piston arranged within a cylinder 52 which is supported upon the upper end of a vertically-disposed pitman 53. The pitmen 53 are pivotally connected to the cranks 54 of a shaft 55. The shaft 55 is journaled in bearings 56 carried by the braces 31 and the frame 1, and said shaft intermediate the ends thereof is provided with a crank portion 57 and a pitman 58, the pitman 58 being driven from a suitable source of power, as an engine 59 located upon the platform 12. The stroke of each of the pitmen 53 is such that when they move upwardly, the lower end of the cylinder 52 engaging with the piston on the lower end of the rod 51 will elevate an intermediate winged plane and on the downward movement of each of the pitmen 53 the cap of the cylinder 52 engaging with the piston within the cylinder will carry the piston rod 51 therewith, thereby lowering the intermediate or winged plane. The manner in which the piston rods 51 are connected to the pitmen 53 enables the adjusting of the intermediate winged planes by the sector frames 42.

The planes 49 are provided with openings 60 adapted to be closed by flaps 61, somewhat similar to flap valves and to always maintain these flaps in position to be closed by a current of air, the lower edges of the flaps are connected by a cable 62 and one end of the cable is fixed to the frame 48 of each intermediate plane or wing.

To add rigidity to the entire machine, cables 63, 64 and 65 are used, the cables 63 extending from the upper ends of the uprights 38 to the rear end of the frame 1, the cables 64 extending from the upper ends of the uprights 37 to the forward end of the bow plane, while the cables 65 are arranged longitudinally of the bow plane to stiffen the same.

A suitable carriage or basket 66 can be arranged in the frame 1 for carrying passengers, baggage or such matter to be transported by the machine.

In the operation of the machine, the operator is enabled to control the engines 11 and 59 and aside from these means of control, the operator must manipulate the cables 25, to raise and lower the stern planes according to the elevation desired. Throughout the operation or flight of the aeroplane, the intermediate planes or wings are oscillated, and to compensate for an adjustment of the angularity of the plane of wing shifting device, the pistons 51 and cylinders 52 are used.

As the stern and bow planes cover a large area, the machine can be safely used and after a desired elevation has been reached, a cessation in the operation of the intermediate planes or wings will allow these planes or wings to coöperate with the stern and bow planes during a soaring movement of the machine or during the operation of the stern propeller. The intermediate planes or wings are principally employed for obtaining desired elevations after the stern planes have been set whereby air currents encountered will have a tendency to deflect the machine either upward or downward depending upon the manner in which the intermediate winged planes have been angularly adjusted with respect to the longitudinal axis of the machine through the medium of the sector frame 42.

Having now described my invention what I claim as new, is:—

1. An aerodrome comprising a supporting frame, stationary and adjustable stern planes supported from said frame, a propeller arranged at the stern of the machine and supported from the frame, means whereby the adjustable stern planes are shifted, bow planes supported from the main frame, oscillatory intermediate planes, means for pivotally supporting and angularly adjusting said intermediate planes, said means supported by said frame, and means for oscillating said intermediate planes.

2. An aerodrome comprising a frame, a stationary and an adjustable stern plane supported from said frame, a propeller supported from said frame and arranged at the rear of the machine, bow planes supported from said frame, a pair of sector frames pivotally supported upon the main frame, means for shifting said sector frames upon their pivots, intermediate planes pivotally connected to said sector frames and angularly adjusted when said sector frames are shifted, and means supported from the main frame for oscillating said intermediate planes.

3. An aerodrome comprising a supporting frame, a stationary stern plane and a pair of adjustable stern planes supported from said main frame, a propeller arranged rearwardly of said stern planes, a drive shaft for the propeller arranged over said stationary stern plane and supported from said frame, bow planes supported from said frame, a pair of pivoted sector frames arranged above said frame, means supported from said frame for shifting said sector frames upon their pivots, intermediate planes pivotally connected to said sector frames and adapted to be angularly adjusted with respect to the longitudinal axis of said frame by said sector frames when these latter are shifted on their pivots, and means supported from said frame and operatively connected with said intermediate planes for oscillating them.

4. An aerodrome comprising a supporting frame, stern planes carried thereby, a stern propeller arranged rearwardly of said stern planes and adapted to be driven from a source of energy carried by said frame, bow planes fixed relatively to said frame, a vertically movable element supported above said frame, a pair of pivoted sector frames arranged above said frame and engaged and shifted on their pivots by said element, intermediate planes pivotally connected to said sector frames and adapted to be angularly adjusted with respect to the longitudinal axis of said frame when said sector frames are shifted on their pivots, and means supported from said frame and operatively connected to said intermediate planes for oscillating them.

5. An aerodrome comprising a supporting frame, a stationary stern plane and a pair of adjustable stern planes supported from said main frame, a propeller arranged rearwardly of said stern planes, a drive shaft for the propeller arranged over said stationary stern plane and supported from said frame, bow planes supported from said frame, a pair of pivoted sector frames arranged above said frame, means supported from said frame for shifting said sector frames upon their pivots, intermediate planes pivotally connected to said sector frames and adapted to be angularly adjusted with respect to the longitudinal axis of said frame by said sector frames when these latter are shifted on their pivots, and means supported from said frame and operatively connected with said intermediate planes for oscillating them, each of said intermediate planes having openings formed therein, and flaps for closing said openings.

6. An aerodrome comprising a supporting frame, stern planes carried thereby, a stern propeller arranged rearwardly of said stern planes and adapted to be driven from a source of energy carried by said frame, bow planes fixed relatively to said frame, a vertically movable element supported above said frame, a pair of pivoted sector frames arranged above said frame and engaged and shifted on their pivots by said element, intermediate planes pivotally connected to said sector frames and adapted to be angularly adjusted with respect to the longitudinal axis of said frame when said sector frames are shifted on their pivots, means supported from said frame and operatively connected to said intermediate planes for oscillating them, each of said intermediate planes having openings formed therein, and flaps for closing said openings.

In testimony whereof I affix my signature in the presence of two witnesses.

HUGO KARDOS.

Witnesses:
PHANOR J. EDER,
L. BLAKE.